United States Patent [19]

Gopp

[11] Patent Number: 5,157,919
[45] Date of Patent: Oct. 27, 1992

[54] CATALYTIC CONVERTER EFFICIENCY MONITORING

[75] Inventor: Alexander Y. Gopp, Ann Arbor, Mich.

[73] Assignee: Ford Motor Company, Dearborn, Mich.

[21] Appl. No.: 733,932

[22] Filed: Jul. 22, 1991

[51] Int. Cl.$^5$ .............................................. F01N 3/20
[52] U.S. Cl. ...................................... 60/274; 60/276; 60/277
[58] Field of Search .......................... 60/274, 277, 276

[56] References Cited

U.S. PATENT DOCUMENTS 4,007,589 2/1977 Neidhard et al. .
4,130,095 12/1978 Bowler ................................. 60/276
4,622,809 11/1986 Abthoff et al. .

Primary Examiner—Douglas Hart
Attorney, Agent, or Firm—Peter Abolins; Roger L. May

[57] ABSTRACT

An on-board catalytic converter efficiency monitoring system uses an exhaust gas oxygen sensor downstream of a converter to enable closed loop air-fuel ratio control. The period of the air-fuel limit cycle is used to determine a time constant parameter of the feedback loop. A parameter in the fuel controller is changed to induce another air-fuel limit cycle frequency. The period of this new air-fuel limit cycle provides additional information with respect to the time constant of the feedback loop. Because it is possible to make other changes to the parameters of the fuel controller, different frequencies can be induced and additional parameters of the feedback loop time constant can be determined. With n different frequencies produced by n different fuel controller parameters it is possible to solve for n different time constants. The system can be used with either one or two EGO sensors depending upon the desired parameter to be solved. It is particularly advantageous to use one EGO sensor downstream of a converter to determine the catalytic efficiency.

12 Claims, 4 Drawing Sheets

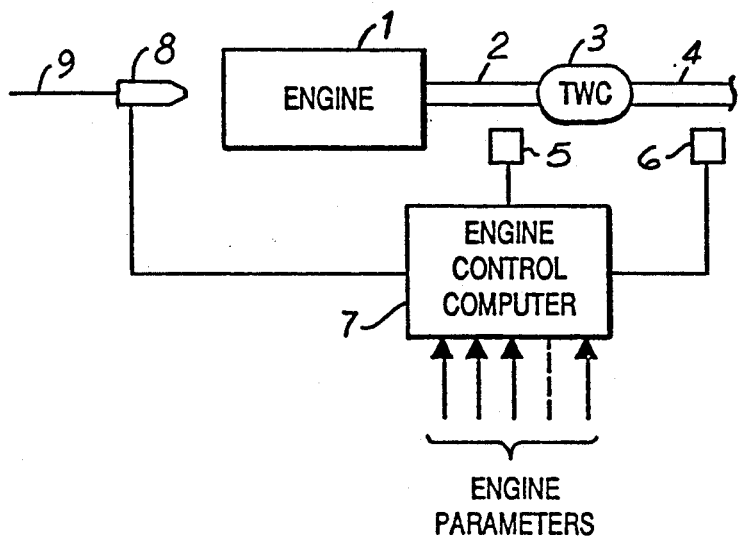
FIG.1
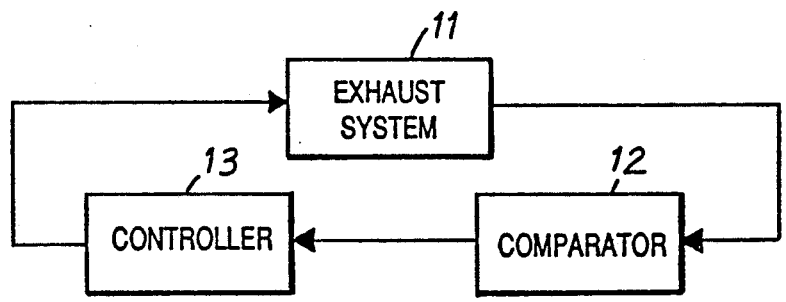
FIG.2
FIG.3
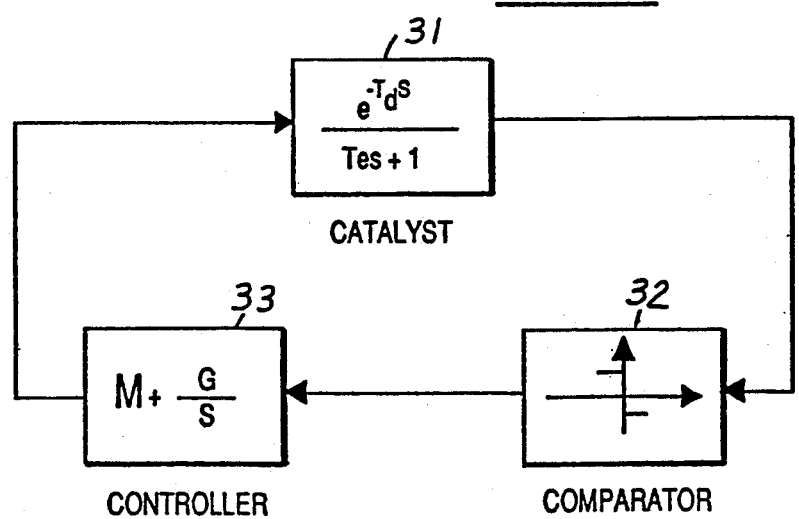

CATALYTIC CONVERTER EFFICIENCY MONITORING

BACKGROUND OF THE INVENTION

1. Field of the Invention

This invention relates to emission control of internal combustion engines. In particular, the invention relates to on-board monitoring of an efficiency of a Three Way Catalytic converter (TWC) installed on a vehicle to minimize emission from an engine.

2. Prior Art

It is known in the field that catalytic conversion relates to a catalytic oxygen storage capability. A properly operating TWC converter dampens exhaust gas component fluctuations in the exhaust stream. One proposed system (see SAE paper 900062, Detection of catalytic efficiency loss using on-board diagnostic) employs two exhaust gas oxygen (EGO) sensors, one upstream and one downstream of the converter, to detect those changes in oxygen content before and after the converter. The system further employs test signals in a form of an air-fuel ratio swing on both sides of stoichiometry at predetermined rates or frequencies caused by fuel control system perturbations. By comparing the change in response patterns between pre- and post-converter EGO sensors, a determination can be made about catalytic efficiency. A deficiency of that method is that during the test the fuel control system operates in an open loop control mode, and air-fuel ratio tends to shift from stoichiometry. Test results also depend on two EGO sensors with different characteristics due to manufacturing tolerances or aging which may lead to additional errors. Further, the particular selected air-fuel ratio swing and frequency greatly influence results of the test. The problem and disadvantages discussed above are overcome by this invention.

SUMMARY OF THE INVENTION

This invention provides a system for on-board catalytic converter efficiency monitoring by measuring parameters of a converter.

A method and apparatus for converter monitoring employs an air-fuel ratio closed loop control system. This control system uses, as a main control input, one EGO sensor located downstream of the converter. The control system operates in a limit cycle mode, and frequencies of the limit cycles are changed by changing parameters of a system controller. A limit cycle is defined as the cycle of variation in air fuel ratio control signal from a rich limit to a lean limit and back to the rich limit again. Parameters of the converter are defined based on such limit cycle frequencies. These parameters are matched with experimentally developed functions to estimate catalytic converter efficiency.

In one particular aspect of the invention, the method includes the steps of: initiation of a closed loop air-fuel ratio control system using an EGO sensor located downstream of the catalytic converter; measuring the frequency of the limit cycle; changing, one or more times, operating or structural parameters of a system controller to generate different limit cycle frequencies; measuring the frequency of each limit cycle; solving a system of equations which relate the limit cycle frequencies to the catalytic converter parameters; and estimating the catalytic converter efficiency using stored experimental data.

BRIEF DESCRIPTION OF THE DRAWINGS

The objects and advantages described herein will be more fully understood by reading the description of the preferred embodiment with references to the drawings wherein:

FIG. 1 is a schematic diagram of an internal combustion engine with converter and control system in accordance with an embodiment of this invention;

FIG. 2 is a block diagram of the control system which is used for catalytic converter efficiency monitoring in accordance with an embodiment of this invention;

FIG. 3 is a block diagram of the control system as described in the invention;

DESCRIPTION OF PREFERRED EMBODIMENTS

Figure 4:
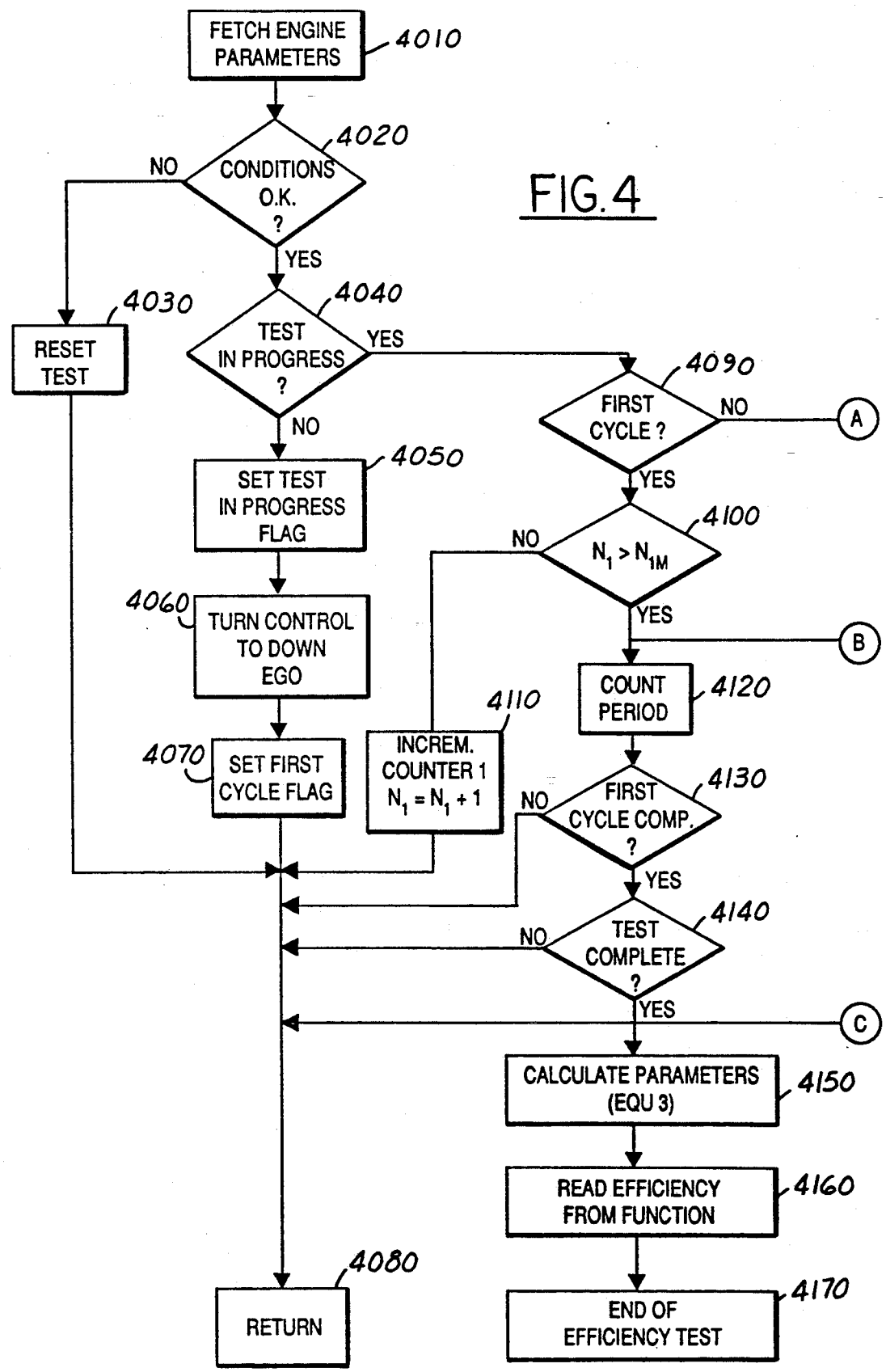
FIGS. 4 and 4A is a flowchart illustrating various process steps performed by a portion of the embodiment shown in FIG. 2.

An example of the embodiment in which the invention claimed herein is used to advantage is now described with reference to attached figures.

First referring to FIG. 1, an internal combustion engine 1 produces exhaust gases which pass through an exhaust manifold and associated piping 2, to a TWC converter 3 and are discharged through exhaust piping 4. The efficiency of converter 3 is measured in accordance with this invention. Two EGO sensors 5 and 6 upstream and downstream, respectively, of the converter are connected to an engine control computer (ECC) 7. It should be noted that either a single upstream EGO sensor 5 control system or a dual EGO sensor control system using both EGO sensors 5 and 6 may be used in accordance with this invention. ECC 7 also receives various engine operating parameters which are advantageous for proper operation of the fuel control system. These parameters include, but are not limited to, engine speed, vehicle speed, air flow, crankshaft position, cooling water temperature and inlet air temperature. Based on a plurality of such engine operating parameters, ECC 7 calculates a fuel pulse width which is delivered to fuel injectors 8. The fuel pulse width is trimmed in accordance with inputs provided by EGO sensors so that limit cycle operation is initiated. This is operation wherein an indication of lean air fuel ratio by an EGO sensor causes the fuel control system to increase the richness of the air fuel ratio until there is an indication of rich air fuel ratio by the EGO sensor, where the fuel control system drives the air fuel ratio leaner. The proposed invention will work with either single or multiple fuel injectors, and only one injector is shown for clarity. Fuel is supplied to fuel injectors through a fuel line 9.

It is noted that many conventional engine components necessary for proper engine operation, such as an ignition system, are not shown. Those skilled in the art will also recognize that the invention may be used to advantage with engines having different number of cylinders or exhaust banks.

The following is a theoretical explanation of the proposed method.

A vehicle exhaust system, having fuel as an input and exhaust gas oxygen concentration as an output, includes engine cylinders, an exhaust mainfold, connecting piping, a TWC converter, and an EGO sensor after a converter. In terms of a control system, the vehicle exhaust system may be described as a transport time delay $T_d$ and a set of first order low pass filters connected in series. The physical nature of the transport time delay $T_d$ is due to an exhaust gas propagation time from a time of delivering fuel to an engine cylinder to a time exhaust gas reaches a EGO sensor. The physical nature of the first order low pass filter time constants $T_{ci}$ are due to a catalytic converter oxygen storage damping of exhaust gas fluctuations, response rate of EGO sensor, and to a minor extent due to physical mixing and chemical reactions in the exhaust manifold and associated piping 2. In a form of Laplace transform, the transfer function of the exhaust system is $$W_{sys}(s) = \exp(-T_d*s) * \prod_{i=1}^{n} 1/(T_{ci}S + 1) \quad \text{(Eqn 1)}$$

where $W_{sys}(s)$ is a transfer function of the exhaust system; $T_d$ (transport time delay), and $T_{ci}$ (low pass filter time constant) are unknown parameters which are to be determined during a test.

Conventional fuel controller is a Proportional/Integral (PI) controller with calibratable gain H and integral G, commonly known as a jumpback and ramp. Its transfer function $W_{cont}(s)$ in a form of Laplace transform is $$W_{cont}(s) = H + G/s \quad \text{(Eqn 2)}$$

It should be mentioned that any more sophisticated controller, for example, a controller with a differential term may be used with the proposed method.

The EGO sensor output is connected to a controller input through a comparator which has the output +1 or −1 depending on what side of stoichiometry the EGO sensor is sensing. A block diagram of the fuel control system is shown on FIG. 2, where numerical 21 refers to the exhaust system in accordance with Eqn 1, numerical 22 refers to a comparator, and numerical 23 refers to a controller described, for example, by Eqn 2.

Calculations of the limit cycle period $T_{li}$ of the control system is known from the art, and equal to $$c_0*T_{li}/4 - c_0*T_d + \sum_{i=1=0}^{n} c_i*(1 - (1 - th(T_{li}/(4*T_{ci})))*\exp(T_d/T_{ci}) \quad \text{(Eqn 3)}$$

which has (n+1) unknown parameters $T_d$, $T_{ci}$, $c_0 = G$ (controller ramp), and $c_i$ is a known function of a controller jumpback H and time constants $T_{ci}$.

In order to solve Eqn 3 to find out all (n+1) unknown parameters, it is necessary to generate (n+1) equations similar to Eqn 3. To achieve this objective, the ramp G, jumpback H, or both of them simultaneously should be changed n times, and (n+1) limit cycles $T_{li}$ corresponding to each controller parameter setting should be measured. Then set of (n+1) algebraic equations may be solved using any known numerical method. Those skilled in the art may use known or develop new methods for solving a set of Eqn 3 which are the best fit for their computing environment.

The above theoretical explanation of the proposed method refers to a general description of the control system. In practice, filtering effects of the exhaust manifold and associated piping 2 may be neglected, and therefore, no time constants are assigned to them.

For simultantiously monitoring catalytic converter efficiency and downstream EGO sensor 6 monitoring, two time constants $T_{c1}$ and $T_{c2}$ characterizing EGO sensor response rate and converter oxygen storage damping are required. Fuel control is turned over to downstream EGO sensor in the case of a conventional fuel control arrangement with one upstream EGO sensor. A control signal from upstream EGO sensor is disabled in the case of a dual EGO fuel control system (see, for example, copending patent application number 07/724,394). Then three limit cycle frequencies are generated by changing, for example, jumpback H to achieve full or 100% jumpback, half or 50% jumpback, and 0% or no jumpback.

For monitoring only catalytic converter efficiency, the time constant of the downstream EGO sensor may be lumped together with a converter time constant, so only one time constant is be required. The above mentioned sequence using three settings of fuel the controller can be simplified to use only two settings. In some cases, transport time delay $T_d$ may be estimated or measured by other known means. In such a case, only one limit cycle frequency is needed to solve Eqn 3, thus providing further simplification in monitoring converter efficiency. For clarity of explanation without losing any generality, the proposed invention will be described below with a reference to a control system to monitor only catalytic converter efficiency. Hence only transport time delay $T_d$ and catalytic converter time constant $T_c$ will be determined.

A block diagram of the control system is shown in FIG. 3, where numeral 31 refers to the converter, numeral 33 refers to the controller, and numeral 32 refers to the comparator. Corresponding transfer functions are also shown on the FIG. 3.

Figure 4A:
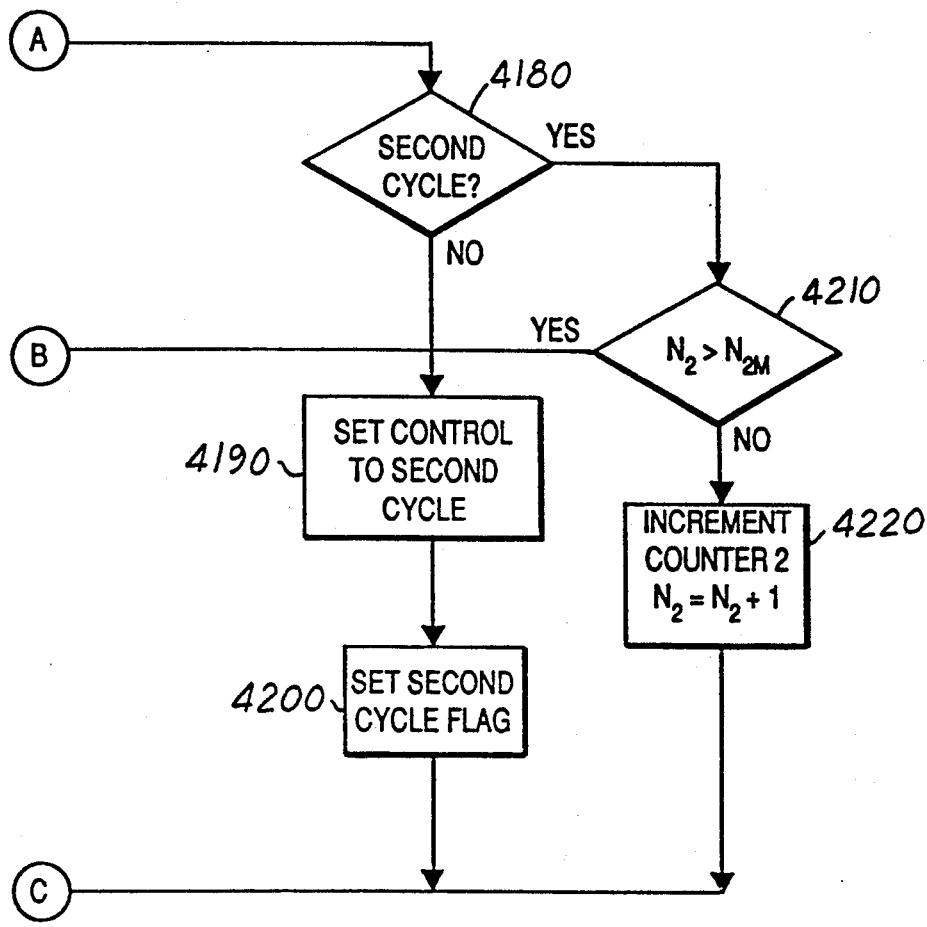
Figure 5:
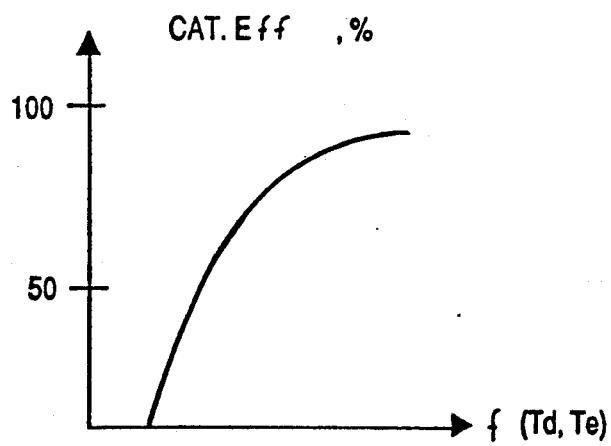
FIG. 5 is a graphical representation of a catalyst efficiency as a function of TWC converter parameters $T_d$ (transport time delay) and $T_c$ (time constant)

The operation of ECC 7 in controlling air-fuel ratio in a manner to estimate the efficiency of a converter is now described with particular reference to the flowchart shown on FIGS. 4 and 4A and an associated experimentally developed TWC converter efficiency function shown in FIG. 5.

At the start of the process in step 4010, engine parameters are read. They include, but are not limited to, parameters which define test conditions and EGO switching. In this description, parameters are read using a constant sampling rate, for example 10 msec. However, in an interrupt driven computer system, different counters which will be described later, may be substituted by timers. This may also require additional steps in the flowchart. In step 4020, test conditions are verified. It may be desirable to initiate a catalytic converter efficiency test at a constant vehicle speed, for example between 20 and 50 MPH, moderate load, and after engine operations are stabilized. Only one converter efficiency test may be desired for a given driving cycle. If the test conditions are satisfied, the test may be started, otherwise at step 4030 the test subroutine is exited. It should be noted that step 4030 will also terminate and reset the test if entry conditions change during test. Step 4040 checks if a catalytic converter monitoring test has already been started. If this is the first entry into the test, step 4050 sets a test in progress flag. In step 4060, the control system is switched to a control signal supplied by downstream EGO sensor 6. Controller jumpback is set to a desired value, for example 100% full jumpback is a typical value. Step 4070 sets a flag indicating that the first limit cycle period is to be measured. Then the test subroutine exits the test at step 4080.

In the following sampling intervals, if test conditions in step 4020 continue to be satisfactory and the test in progress flag is set in step 4050, logic flow goes to step 4090 which checks if this is a measurement of the first limit cycle period. Steps 4100 and 4110 provide a certain time delay to settle possible transient conditions associated with the change of the controller input. Step 4110 represents a counter which is incremented each sampling interval to provide a constant sampling rate counter content proportional to elapsed time. Step 4100 verifies that this time has elapsed. After this entry delay is completed, step 4120 starts calculations, in the following sampling intervals, first limit cycle period $T_{l1}$. Complete operation of step 4120 will be explained later. Step 4120 sets flags for steps 4090 and 4130, indicating completion of measurements of the first limit cycle period, and a flag for step 4140, indicating completion of catalytic converter monitoring test. If conditions in steps 4130 or 4140 are not met, subroutine is exited through a return in step 4080. When both limit cycle periods $T_{l1}$ and $T_{l2}$ are measured as indicated by a flag in step 4140, step 4150 solves equations 3 to calculate transport time delay $T_d$ and converter time constant $T_c$. Step 4160 generates a function $f(T_d, T_c)$ which is an input to the experimental TWC converter efficiency function shown in FIG. 5. Step 4170 makes a determination if the converter has passed the efficiency test.

After the first limit cycle period is determined, the first cycle flag in step 4090 is reset and logic flow proceeds to step 4180. If a second cycle flag in step 4180 is not set and measurement of the second limit cycle period has not been started, new controller parameters are set in step 4190. For example, jumpback is set to 0%. This means that the original PI controller is changed in this example to an I controller, and another limit cycle, longer than a limit cycle with the PI controller, will be initiated. Step 4200 sets the second cycle flag to start second limit cycle period measurement. Steps 4210 and 4220 provide an entry time delay, similar to one described in steps 4100 and 4110, to settle possible transient conditions associated with the change in the controller parameters. After this entry time delay is completed, step 4210 directs the subroutine logic flow to step 4120 which will measure the second limit cycle period.

Figure 6:
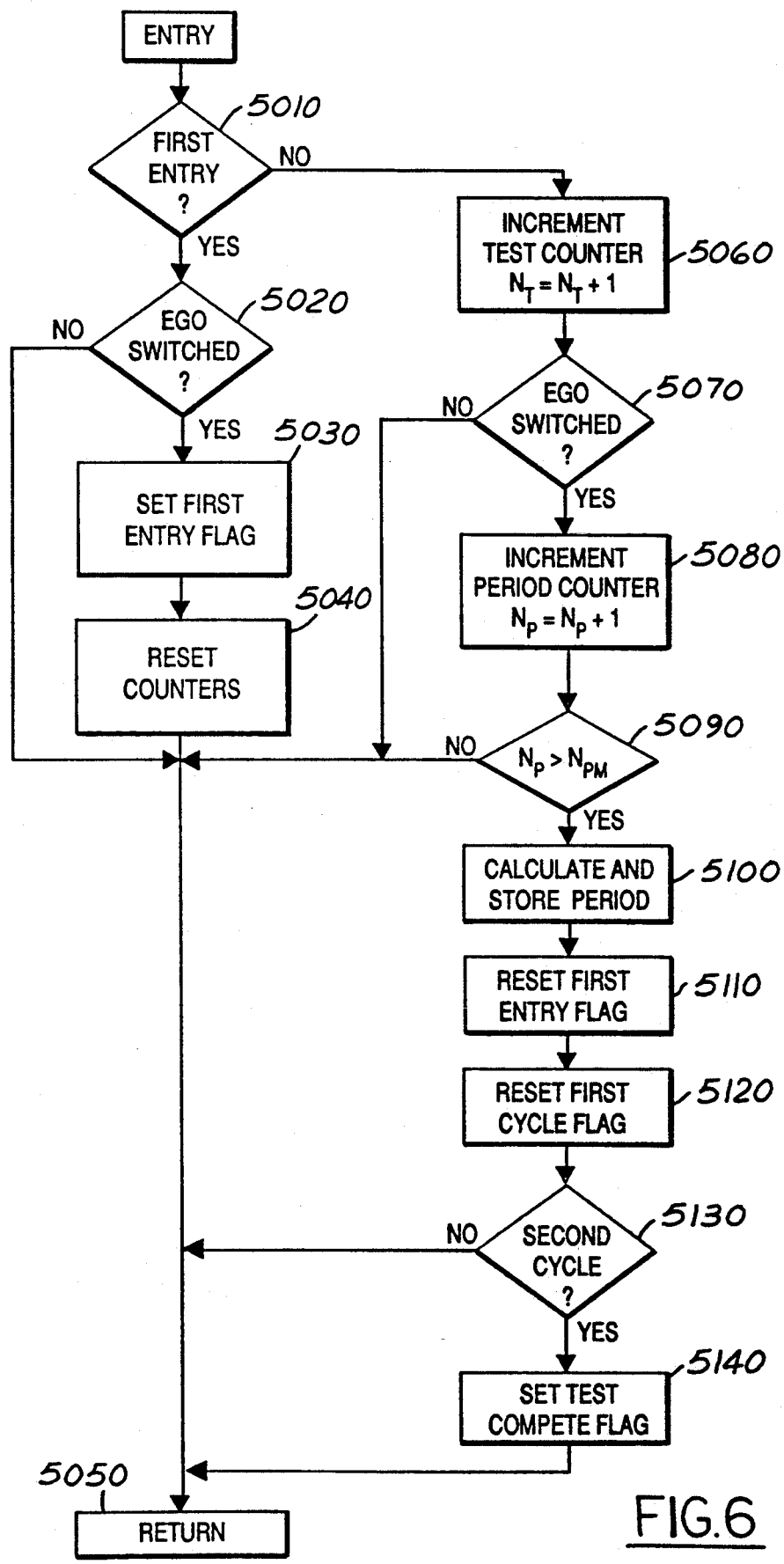
FIG. 6 is a flowchart illustrating various process steps performed by a portion of the flowchart shown on FIG. 4 to calculate a limit cycle period in accordance with an embodiment of this invention.

Referring to FIG. 6, step 4120 is common to all limit cycles. Step 5010 checks if this is the first entry for any limit cycle period measurement. If this is the first entry, logic flow goes to step 5020 to check for the first EGO sensor switch. If there is no EGO switch, logic flow goes to step 5050. After the first EGO sensor switch is detected, step 5030 sets a first entry flag for step 5010, and resets test and period counters. Test counter $N_t$ is incremented in step 5060 during each sampling interval after the first entry flag is set. If an EGO sensor switch is detected in step 5070, period counter $N_p$ is incremented for each EGO sensor switch. When a preselected number of limit cycle periods, as counted by period counter $N_p$, is detected in step 5090, step 5100 calculates, an average period $T_{li}$ for a given limit cycle, and stores it in memory for future use. Step 5110 resets the first entry flag for use in step 5010, thus preparing step 4120 for measuring another limit cycle period. Next step 5120 resets the first cycle flag used in steps 4090 and 4130, thus allowing measurement of the second limit cycle period in step 4180. The second cycle flag which is set in step 4180 is checked in step 5130 after measurement of the second limit cycle is completed. Step 5140 sets a test complete flag which allows step 4140 to proceed to step 4150, as described above. If the third limit cycle is required as in the case of a downstream EGO sensor time constant calculations, one more branch should be added to the flowchart similar to steps 4180 through 4220. Controller jumpback will be set to a new value, for example, 50% jumpback.

Various modifications and variations will no doubt occur to those skilled in the art to which this invention pertains. For example, the particular feedback gain or operating parameters used to vary frequency may be varied from that disclosed herein. These and other variations which basically rely on the teachings through which this disclosure has advanced the art are properly considered within the scope of this invention.

This concludes the description of the preferred embodiment. It is intended that the scope of the invention be limited to only the following claims.

What is claimed:

1. A method for monitoring an internal combustion engine on-board catalytic converter efficiency comprising the steps of:

establishing predetermined test entry conditions;

transferring fuel control system input to an EGO sensor located downstream of a converter;

measuring a characteristic of a first air/fuel ratio limit cycle with a first set of fuel controller parameters;

changing fuel controller parameters;

measuring a characteristic of a second air/fuel ratio limit cycle with a second set of fuel controller parameters;

calculating a transport time delay and a time constant of a converter as a function of said first and second limit cycles; and determining catalytic converter efficiency from a predetermined catalytic efficiency characterized as a function of a transport time delay and a time constant.

2. A method for monitoring an internal combustion engine on-board catalytic converter efficiency as recited in claim 1, wherein the step of establishing predetermined test entry conditions includes the steps of:

establishing relatively constant engine and vehicle speeds; and establishing relatively constant engine load.

3. A method for monitoring an internal combustion engine on-board catalytic converter efficiency as recited in claim 2, wherein the step of measuring a characteristic of an air/fuel limit cycle includes determining an average air/fuel limit cycle period.

4. An apparatus for monitoring an internal combustion engine on-board catalytic converter efficiency wherein a converter is coupled downstream of the engine, said apparatus comprising:

an EGO sensor downstream of the converter;

fuel injectors for supplying fuel to the engine;

a fuel controller coupled to the fuel injectors for determining the amount of fuel supplied;

means for transferring fuel control to said EGO sensor located downstream of the catalyst;

means for calculating an average limit cycle period;

means for changing operating parameters of said fuel controller;

means for calculating a transport time delay and a time constant characterizing said converter; and means for calculating a catalytic efficiency from a predetermined catalytic efficiency characterized as a function of a transport time delay and a time constant.

5. A method for monitoring time constants in a feedback loop with a fuel controller controlling air-fuel ratio of an internal combustion engine comprising the steps of:

establishing entry conditions for operation of the method;

controlling a feedback air-fuel ratio control system using at least one exhaust gas oxygen sensor;

measuring a characteristic of a first air/fuel ratio limit cycle resulting from a first set of fuel controller parameters;

changing the fuel controller parameters;

measuring a characteristic of a second air/fuel ratio limit cycle resulting from a second set of fuel controller parameters;

calculating a time constant function of the feedback loop as a function of said first and second limit cycle characterizations;

repeating the steps of changing the fuel controller parameters, characterizing the air/fuel limit cycles with the new fuel controller parameters, and calculating a time constant function each time an additional time constant parameter is desired to be established.

6. A method as recited in claim 5 wherein the time constant established is related to an EGO sensor downstream of a converter.

7. A method as recited in claim 6 wherein the time constant established is related to the operation of an EGO sensor upstream of a converter.

8. A method as recited in claim 7 further comprising the step of establishing catalytic efficiency as a function of the time constant function.

9. A method as recited in claim 8 wherein the time function desired is the transport time delay.

10. A method as recited in claim 9 wherein changing the fuel controller parameters is done by changing the ramp rate of an air fuel ratio limit cycle.

11. A method as recited in claim 9 wherein changing the fuel controller parameters is done by changing the gain of the fuel controller thereby changing the amount of jumpback in an air fuel ratio limit cycle.

12. A method as recited in claim 11 wherein the amount of jumpback is selected from 0%, 50%, 100%.

* * * * *